Jan. 31, 1950        G. C. BUCK        2,496,197
TESTING EQUIPMENT FOR ELECTRICAL APPARATUS
Filed March 8, 1948
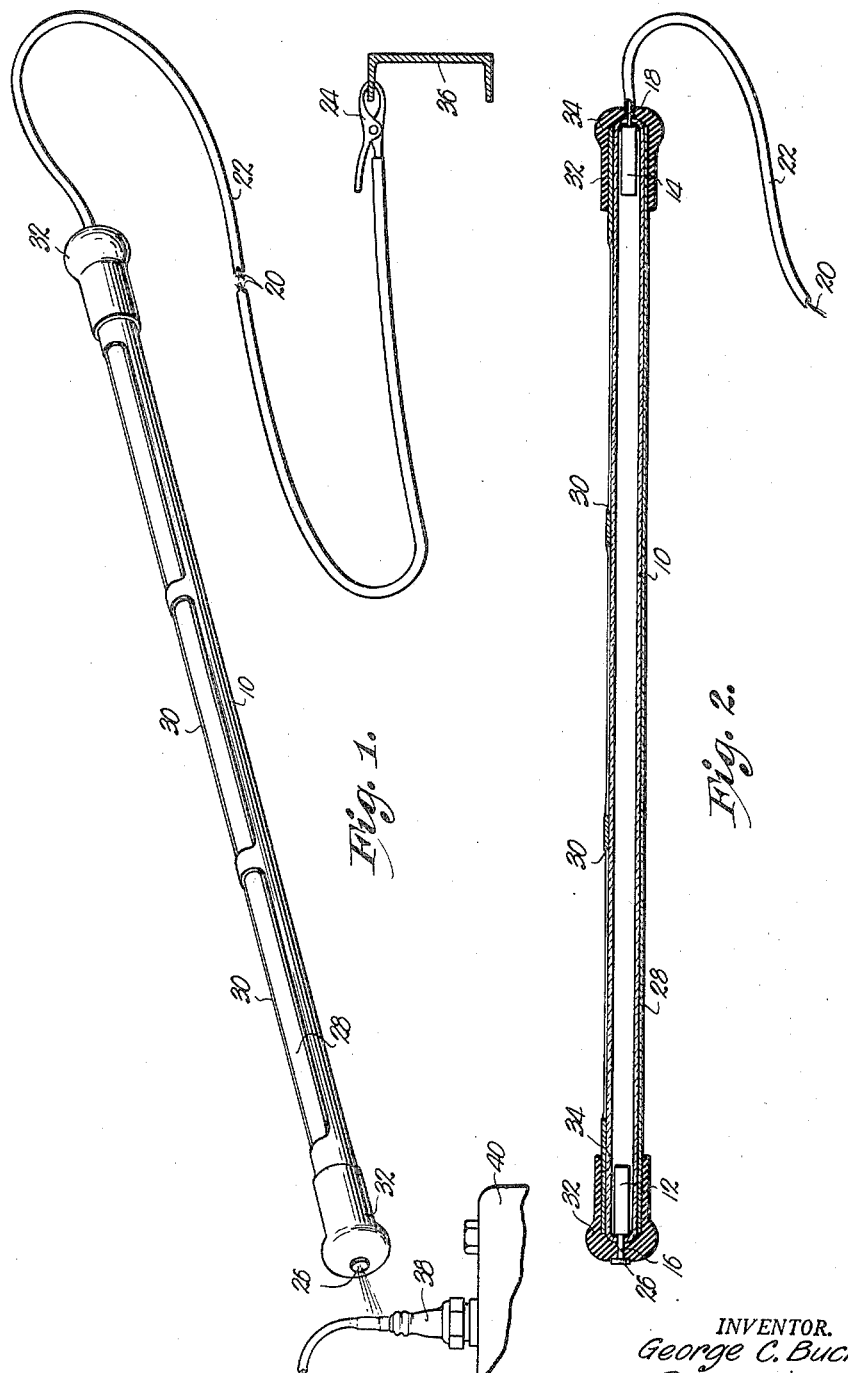
INVENTOR.
George C. Buck
BY 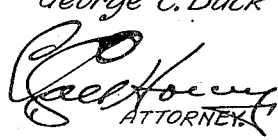
ATTORNEY Patented Jan. 31, 1950

2,496,197

UNITED STATES PATENT OFFICE 2,496,197

TESTING EQUIPMENT FOR ELECTRICAL APPARATUS

George C. Buck, Odessa, Mo.

Application March 8, 1948, Serial No. 13,673

2 Claims. (Cl. 175—183)

This invention relates to a device for testing electrical apparatus and has for its primary object, the provision of an instrument capable of detecting faulty connections and the like in electrical circuits and electrical elements generally by illumination when brought in close proximity therewith.

The most important object of this invention is the provision of a testing device for electrical apparatus having an elongated vacuum tube provided with gas capable of illumination when the instrument is brought into close proximity with an electrical circuit, said tube being provided with a pair of spaced apart electrodes, one of such electrodes having a lead line for connection with a grounded element.

Another important object of this invention is to provide a testing device for electrical apparatus having a sleeve telescoping the aforesaid elongated tube for protecting the same against breakage, said sleeve having a plurality of openings formed therein to render the vacuum tube visible.

Another important object of this invention is to provide a testing device of the aforesaid character having the ends thereof protected by a cap of resilient and non-conducting material.

Other more minor objects will be made clear or become apparent during the course of the following specification, reference being had to the accompanying drawing, wherein:

Fig. 1 is a perspective view of a testing device for electrical apparatus showing the same in operative use with a part of an automobile ignition system; and Fig. 2 is a substantially central longitudinal cross sectional view taken through the device shown in Fig. 1.

In the drawing, the numeral 10 designates an elongated, hollow tube made from glass or other transparent material having the ends thereof closed and provided with a pair of electrodes 12 and 14. These electrodes 12 and 14 are positioned within the tube 10 adjacent each end thereof respectively and have reduced portions 16 and 18 respectively passing through openings provided in such ends of the tube 10. These reduced portions 16 and 18 are sealed within such openings and in any suitable manner to the end that the tube 10 is capable of containing any of the well known gases capable of illumination when the device is brought into adjacency with an electrical circuit as hereinafter will be made more clear.

The electrode 14 has a conductor 20 connected to the outermost end of the reduced portion 18 thereof, said conductor being entirely covered by suitable insulation 22. The outermost free end of this conductor 20 opposite to the electrode 14 has a conventional clamp 24 secured thereto.

The electrode 12 has a knob 26 formed on the outermost free end of the portion 16 thereof. The tube 10 has a protecting shell or cover 28 of tubular nature disposed in telescoping relationship thereto. This shell 28 is provided with a plurality of elongated openings 30 disposed longitudinally with the tube 10 to present open spaces whereby portions of the tube 10 remain exposed. Any suitable means for holding the shell 28 upon the tube 10 such as a tight slip fit may be used.

Each of the ends of the tube 10 and therefore, the covering shell 28 is provided with a cap 32. These caps 32 are each provided with a cavity 34 for receiving the proximal ends of the tube 10 and shell 28 and are made from any resilient and non-conducting material such as rubber. The caps 32 completely enclose the proximal end of the tube 28 and cover a portion of the sleeve-like shell 28 by virtue of the hollow cavity 34 formed therein. As clearly illustrated in Fig. 2, the caps 32 are each provided with openings for receiving the reduced portions 16 and 18 of the electrodes 12 and 14 respectively. If desired, the cap members 32 may be held in place upon the shell 28 by adhesion or simply by a tight slip fit.

In use the instrument is first grounded by affixing the clamp member 24 upon a metallic element such as a part of the frame work 36 of the automobile. The electrode 12 is then brought into close proximity with the electrical circuit or electrical element to be tested, such as a spark plug 38 of an internal combustion engine head 40. When electricity is caused to flow through the ignition system of the automobile, the condition of such current will show in the tube 28 through the openings 30 of shell 28. In other words, the gas within the tube 10 will become eliminated, the color thereof depending upon the condition of the electrical current. Different types of electrical trouble will indicate by different colors of the gas within tube 10.

The device may be used to check worn distributor points, leaking condensers, damaged distributor bushings or breaker arm plates, weak coils or coil suppressers, inoperable or defective spark plugs, shorts in ignition wires or leakage therein and many other defects common in electrical apparatus.

Through use of the device above described, an automobile mechanic can instantly determine whether or not automobile trouble is in the ignition or carburation. When the spark plug 38 is touched by the electrode 12, the light appearing through the openings 30 of shell 28 should be bright and clear and if not, the operator knows immediately that the distributor points or the condenser need checking. The absence of any light or a dim light in the tube 10, indicates a "short" in the spark plugs or other wires of the ignition system and perhaps a worn distributor cam. If the light indicated is extremely bright, then the mechanic knows immediately that the spark gap is too wide. Intermediate flashing tells the operator that the ignition system has a weak coil.

Another indication of trouble is the appearance of the continuous stream of light at one or more of the spark plugs which teaches that the distributor cap is perhaps cracked or has a "short" therein.

It is apparent from the foregoing that the device forming the subject matter of this invention has many uses and may be used indiscriminately by a mechanic without the danger of breakage because of the precise protection that has been given to the glass or otherwise transparent tube 10. The shell 28 thereof protects substantially the entire length of the tube 10 and the rubber caps 32 at the ends thereof, not only protect the operator from possible shock if the shell 28 is made from metallic substance but also assures that the ends of tube 10 will not be broken when placed in use.

While only one form of the present invention has been illustrated and described, it is manifest that many changes and modifications particularly with details of construction, may be made without departing from the spirit of this invention as defined by the appended claims.

Having thus described the invention, what is claimed as new and desired to be secured by Letters Patent is:

1. A testing device for electrical apparatus comprising an elongated vacuum tube of transparent material; a pair of electrodes rigidly secured within the tube and extending through each end thereof respectively; an extended conductor having connection with the outermost end of one of said electrodes, said tube having a gas therein capable of becoming illuminated when said conductor is grounded and the outermost end of the other electrode is adjacent an electric current; and a tubular protecting sleeve tightly circumscribing said tube, with the ends of the sleeve terminating in spaced relationship to proximal electrodes, said sleeve having a plurality of aligned, longitudinally extending, elongated slots therein for exposing parts of said tube.

2. A testing device for electrical apparatus comprising an elongated vacuum tube of transparent material; a pair of electrodes rigidly secured within the tube and extending through each end thereof respectively; an extended conductor having connection with the outermost end of one of said electrodes, said tube having a gas therein capable of becoming illuminated when said conductor is grounded and the outermost end of the other electrode is adjacent an electric current; a tubular protecting sleeve tightly circumscribing said tube, with the ends of the sleeve spaced inwardly from proximal ends of the tube, said sleeve having a plurality of openings therein for exposing parts of said tube; and a protecting cap of resilient, non-conducting material completely covering each end respectively of said tube, one of said caps enclosing said one electrode and joining with the insulation of said conductor, the other cap enclosing a portion of said other electrode, both caps tightly telescoping adjacent ends respectively of said sleeve.

GEORGE C. BUCK.

REFERENCES CITED

The following references are of record in the file of this patent:

UNITED STATES PATENTS

| Number | Name | Date |
|---|---|---|
| 1,380,839 | Rosenbauer | June 7, 1921 |
| 1,701,196 | Spangler | Feb. 5, 1929 |
| 1,915,709 | Wiseman | June 27, 1933 |
| 2,163,676 | Gizzarelli | June 27, 1939 |